Patented July 20, 1926.

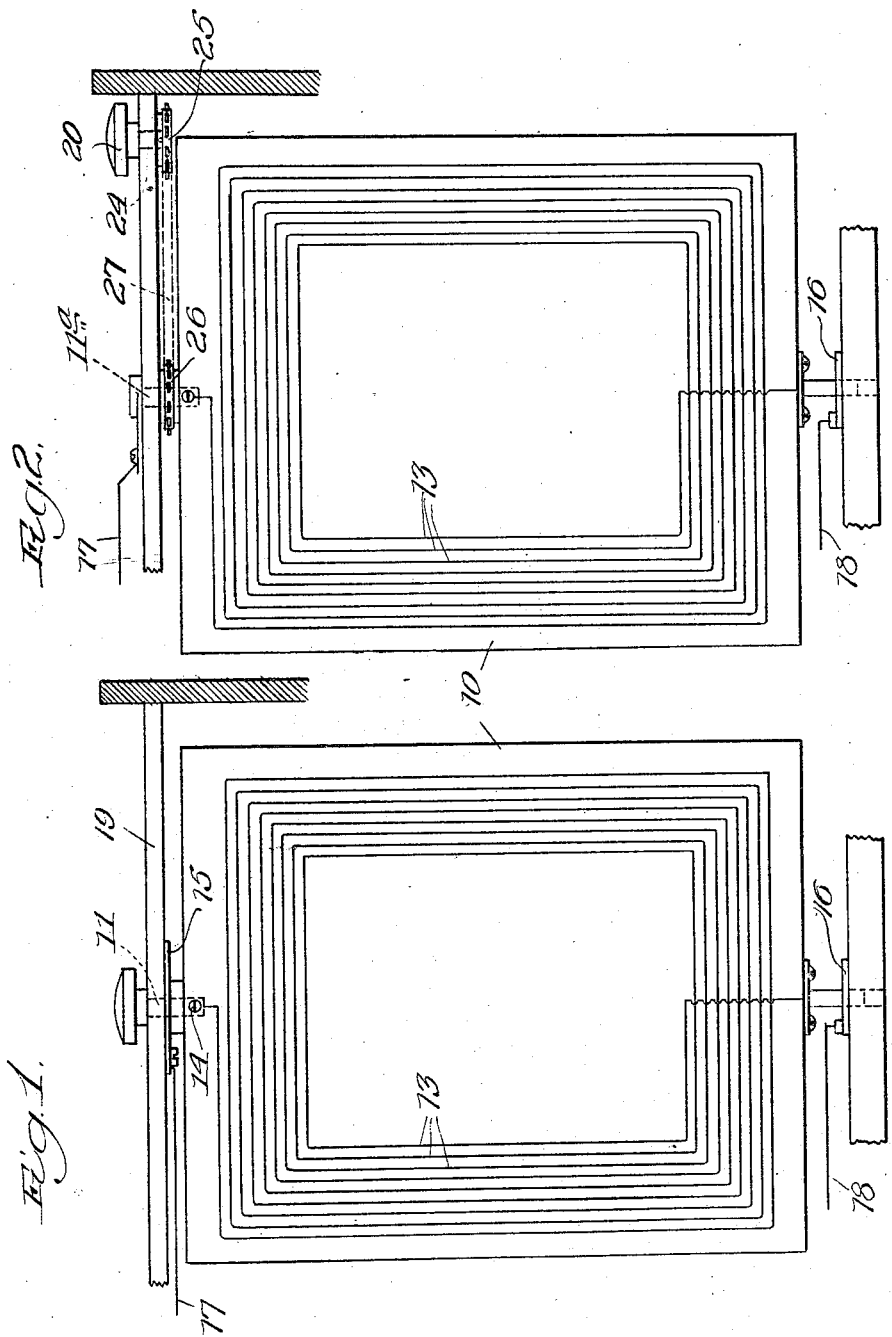

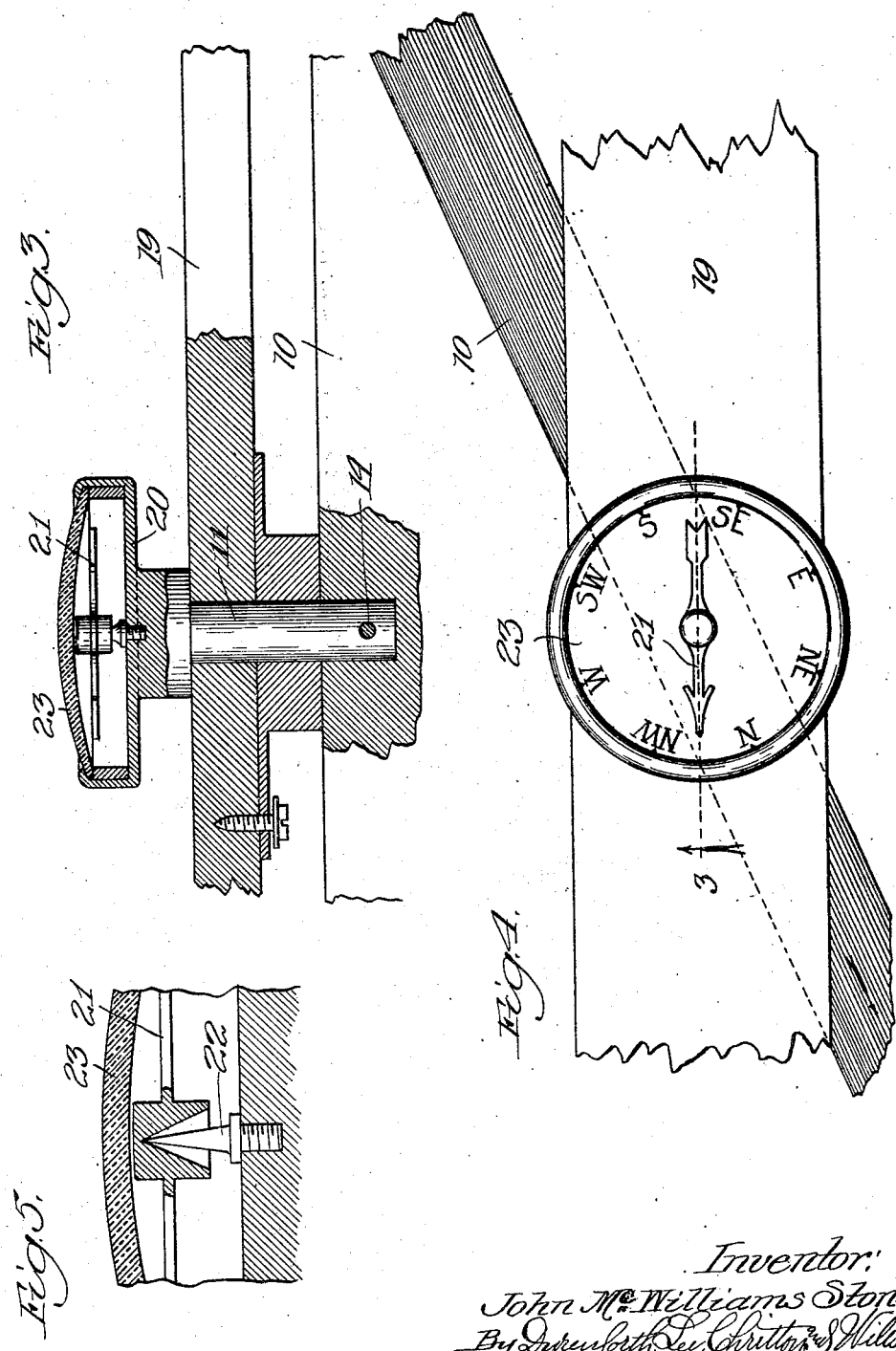

1,593,276

UNITED STATES PATENT OFFICE.

JOHN McWILLIAMS STONE, OF CHICAGO, ILLINOIS, ASSIGNOR TO THE OPERADIO CORPORATION, OF CHICAGO, ILLINOIS, A CORPORATION OF ILLINOIS.

RADIO DIRECTION FINDER.

Application filed December 1, 1924. Serial No. 753,168.

This invention relates to radio direction finders and is particularly adapted to be used with radio receiving apparatus and the like wherein there is a movable loop aerial.

Heretofore it has been customary in using such an aerial to turn its plane into the general direction of the station from which it is desired to receive and having picked up the desired station the loop is then turned so as to give maximum strength of signal. The present invention however seeks to overcome the uncertainty of such a procedure by providing a combined loop aerial and compass which, once the direction of the desired station is ascertained, will permit that station to again be picked up by turning the loop until the compass needle points to the same indication on the dial as was previously ascertained. This is of particular importance in portable receiving sets where the operator in moving the set about from place to place, often is at a loss to guess the direction of the station which he desires to pick up.

It will also be understood that this combination is of great importance as a radio wave direction finder.

This and other objects are accomplished by this invention which are fully described in the following specification and shown in the accompanying drawings, in which:

Figure 1 is a front elevation of a loop aerial embodying the invention;

Fig. 2 is a modified form of the same;

Fig. 3 is an enlarged section through the dial case on the line 3 of Fig. 4;

Fig. 4 is a top plan view of the same; and

Fig. 5 is a still more greatly enlarged section on the line 3 of Fig. 4.

The invention illustrated comprises a loop aerial having a wooden frame 10 secured to metallic pins 11 and 12, which lie on a vertical axis about which the aerial swings. On this frame is mounted a loop 13 connected at one end to the pin 11 by means of a screw 14 and at the other end to the lower pin 12. These pins pass through bearing plates 15 and 16 from which wires 17 and 18 lead to the receiving circuit.

In Fig. 1 the pin 11 extends through the supporting member 19 and carries a compass case 20. This case is hollow and has a magnetic needle 21 mounted to swing about the pin 22, the needle being retained thereon by means of the glass cover 23. Upon the inner bottom surface of this case may be placed a graduated compass dial such as is shown in Fig. 4. If desired however this may be divided into any number of equally numbered spaces. Having ascertained which side of the loop operates better when pointed toward the station from which it is desired to receive, the compass case is secured thereto with the north of the compass dial pointing toward the said side of the loop.

Having located a station with the loop, note is made of the direction as indicated by the compass needle 21 either in terms of the usual points of the compass as shown in Fig. 4, or in terms of numbers if a numbered compass dial is used instead. If it is again desired to pick up this same station, the dial case 20 serving as a knob is turned until the magnetic needle 21 again points to this same indication when the loop aerial 10 will again be in the proper direction for receiving, provided the set is still in the same approximate direction from the receiving station as it was when the direction of this station was previously observed. In this connection, however, it will be noted that this use of the device is sometimes rendered inoperative by the presence of metal as in the steel frames of office buildings and the like.

While the form of the device shown in Fig. 1 is more simple, that in Fig. 2 may be preferred for many receiving sets because this geared arrangement permits better location of the knob for tuning the loop aerial. This differs from the same shown in Fig. 1 principally in having the compass case 20 mounted at one side of the axis of the loop upon a short shaft 24, upon the opposite end of which is mounted a sprocket 25. This is geared to a sprocket 26 of the same size upon the pin 11ª by means of a chain 27. Otherwise the construction and method of operation of the device is the same as that previously described.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In combination, a loop aerial adapted to swing about a vertical point, a knob operably connected to said loop aerial for turning the same, and a magnetic needle movable within said knob for indicating the position of said loop.

2. In combination, a loop aerial adapted to swing about a vertical pivot, a compass case operably connected to said loop aerial so as to be movable therewith, a magnetic needle movable within said case, and a graduated dial over which said needle moves and which is positioned relative to said loop aerial so that said magnetic needle indicates the position of said loop aerial.

JOHN McWILLIAMS STONE.